US008250159B2

(12) United States Patent
Starbuck et al.

(10) Patent No.: US 8,250,159 B2
(45) Date of Patent: Aug. 21, 2012

(54) MESSAGE RENDERING FOR IDENTIFICATION OF CONTENT FEATURES

(75) Inventors: Bryan T. Starbuck, Duvall, WA (US); Robert L. Rounthwaite, Fall City, WA (US); David E. Heckerman, Bellevue, WA (US); Joshua T. Goodman, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 185 days.

(21) Appl. No.: 12/359,126

(22) Filed: Jan. 23, 2009

(65) Prior Publication Data

US 2010/0088380 A1    Apr. 8, 2010

Related U.S. Application Data

(62) Division of application No. 10/428,649, filed on May 2, 2003, now Pat. No. 7,483,947.

(51) Int. Cl.
*G06F 15/16* (2006.01)
*G06F 12/16* (2006.01)

(52) U.S. Cl. .......................................... 709/206; 726/22

(58) Field of Classification Search .......... 709/204–207, 709/223–226; 726/22–24
See application file for complete search history.

(56) References Cited

U.S. PATENT DOCUMENTS

| | | | |
|---|---|---|---|
| 5,377,354 A | 12/1994 | Scannell et al. | |
| 5,619,648 A | 4/1997 | Canale et al. | |
| 5,638,487 A | 6/1997 | Chigier | |
| 5,704,017 A | 12/1997 | Heckerman et al. | |
| 5,805,801 A | 9/1998 | Holloway et al. | |
| 5,835,087 A | 11/1998 | Herz et al. | |
| 5,884,033 A | 3/1999 | Duvall et al. | |
| 5,905,859 A | 5/1999 | Holloway et al. | |
| 6,003,027 A | 12/1999 | Prager | |
| 6,023,723 A | 2/2000 | McCormick et al. | |
| 6,047,242 A | 4/2000 | Benson | |
| 6,052,709 A | 4/2000 | Paul | |
| 6,072,942 A | 6/2000 | Stockwell et al. | |

(Continued)

FOREIGN PATENT DOCUMENTS

EP    0413537 A3    2/1991

(Continued)

OTHER PUBLICATIONS

"MIME", The Microsoft Computer Dictionary, 5th Edition, Redmond, WA, Microsoft Press, May 2002, 1 page.

(Continued)

*Primary Examiner* — Brendan Higa
(74) *Attorney, Agent, or Firm* — Lee & Hayes, PLLC (57) ABSTRACT

Architecture for detecting and removing obfuscating clutter from the subject and/or body of a message, e.g., e-mail, prior to filtering of the message, to identify junk messages commonly referred to as spam. The technique utilizes the powerful features built into an HTML rendering engine to strip the HTML instructions for all non-substantive aspects of the message. Pre-processing includes pre-rendering of the message into a final format, which final format is that which is displayed by the rendering engine to the user. The final format message is then converted to a text-only format to remove graphics, color, non-text decoration, and spacing that cannot be rendered as ASCII-style or Unicode-style characters. The result is essentially to reduce each message to its common denominator essentials so that the junk mail filter can view each message on an equal basis.

28 Claims, 6 Drawing Sheets

U.S. PATENT DOCUMENTS

| | | | |
|---|---|---|---|
| 6,101,531 A | 8/2000 | Eggleston et al. | |
| 6,112,227 A | 8/2000 | Heiner | |
| 6,122,657 A | 9/2000 | Hoffman, Jr. et al. | |
| 6,161,130 A * | 12/2000 | Horvitz et al. | 709/206 |
| 6,167,434 A | 12/2000 | Pang | |
| 6,192,360 B1 | 2/2001 | Dumais et al. | |
| 6,199,102 B1 | 3/2001 | Cobb | |
| 6,266,692 B1 | 7/2001 | Greenstein | |
| 6,308,273 B1 | 10/2001 | Goertzel et al. | |
| 6,314,421 B1 | 11/2001 | Sharnoff et al. | |
| 6,321,267 B1 | 11/2001 | Donaldson | |
| 6,327,617 B1 | 12/2001 | Fawcett | |
| 6,330,590 B1 | 12/2001 | Cotten | |
| 6,351,740 B1 | 2/2002 | Rabinowitz | |
| 6,370,526 B1 | 4/2002 | Agrawal et al. | |
| 6,393,465 B2 | 5/2002 | Leeds | |
| 6,421,709 B1 | 7/2002 | McCormick et al. | |
| 6,424,997 B1 | 7/2002 | Buskirk, Jr. et al. | |
| 6,434,600 B2 | 8/2002 | Waite et al. | |
| 6,453,327 B1 | 9/2002 | Nielsen | |
| 6,477,551 B1 | 11/2002 | Johnson et al. | |
| 6,484,197 B1 | 11/2002 | Donohue | |
| 6,484,261 B1 | 11/2002 | Wiegel | |
| 6,505,250 B2 | 1/2003 | Freund et al. | |
| 6,546,416 B1 | 4/2003 | Kirsch | |
| 6,592,627 B1 | 7/2003 | Agrawal et al. | |
| 6,615,242 B1 * | 9/2003 | Riemers | 709/206 |
| 6,633,855 B1 | 10/2003 | Auvenshine | |
| 6,643,686 B1 | 11/2003 | Hall | |
| 6,684,201 B1 | 1/2004 | Brill | |
| 6,691,156 B1 | 2/2004 | Drummond et al. | |
| 6,701,350 B1 | 3/2004 | Mitchell | |
| 6,701,440 B1 | 3/2004 | Kim et al. | |
| 6,728,690 B1 | 4/2004 | Meek et al. | |
| 6,732,149 B1 | 5/2004 | Kephart | |
| 6,732,157 B1 | 5/2004 | Gordon et al. | |
| 6,732,273 B1 | 5/2004 | Byers | |
| 6,742,047 B1 | 5/2004 | Tso | |
| 6,748,422 B2 | 6/2004 | Morin et al. | |
| 6,751,348 B2 | 6/2004 | Buzuloiu et al. | |
| 6,757,830 B1 | 6/2004 | Tarbotton et al. | |
| 6,768,991 B2 | 7/2004 | Hearnden | |
| 6,775,704 B1 | 8/2004 | Watson et al. | |
| 6,779,021 B1 * | 8/2004 | Bates et al. | 709/206 |
| 6,785,820 B1 | 8/2004 | Muttik et al. | |
| 6,842,773 B1 * | 1/2005 | Ralston et al. | 709/206 |
| 6,853,749 B2 | 2/2005 | Watanabe et al. | |
| 6,901,398 B1 | 5/2005 | Horvitz et al. | |
| 6,915,334 B1 | 7/2005 | Hall | |
| 6,920,477 B2 | 7/2005 | Mitzenmacher | |
| 6,928,465 B2 | 8/2005 | Earnest | |
| 6,971,023 B1 | 11/2005 | Makinson et al. | |
| 7,003,555 B1 | 2/2006 | Jungck | |
| 7,032,030 B1 * | 4/2006 | Codignotto | 709/246 |
| 7,051,077 B2 | 5/2006 | Lin | |
| 7,072,942 B1 | 7/2006 | Maller | |
| 7,092,992 B1 * | 8/2006 | Yu | 709/206 |
| 7,117,358 B2 | 10/2006 | Bandini et al. | |
| 7,146,402 B2 | 12/2006 | Kucherawy | |
| 7,155,243 B2 | 12/2006 | Baldwin et al. | |
| 7,155,484 B2 | 12/2006 | Malik | |
| 7,188,369 B2 | 3/2007 | Ho et al. | |
| 7,249,162 B2 | 7/2007 | Rounthwaite et al. | |
| 7,263,607 B2 | 8/2007 | Ingerman et al. | |
| 7,293,063 B1 | 11/2007 | Sobel | |
| 7,308,648 B1 * | 12/2007 | Buchthal et al. | 715/234 |
| 7,320,020 B2 | 1/2008 | Chadwick et al. | |
| 7,483,947 B2 * | 1/2009 | Starbuck et al. | 709/206 |
| 7,647,376 B1 * | 1/2010 | Jagger et al. | 709/206 |
| 8,046,832 B2 | 10/2011 | Goodman et al. | |
| 2001/0046307 A1 | 11/2001 | Wong | |
| 2002/0016956 A1 | 2/2002 | Fawcett | |
| 2002/0059425 A1 | 5/2002 | Belfiore et al. | |
| 2002/0073157 A1 | 6/2002 | Newman et al. | |
| 2002/0091738 A1 | 7/2002 | Rohrbaugh et al. | |
| 2002/0124025 A1 | 9/2002 | Janakiraman et al. | |
| 2002/0147782 A1 | 10/2002 | Dimitrova et al. | |
| 2002/0174185 A1 | 11/2002 | Rawat et al. | |
| 2002/0184315 A1 | 12/2002 | Earnest | |
| 2002/0199095 A1 | 12/2002 | Bandini et al. | |
| 2003/0009495 A1 | 1/2003 | Adjaoute | |
| 2003/0009698 A1 | 1/2003 | Lindeman et al. | |
| 2003/0014444 A1 * | 1/2003 | Wu | 707/515 |
| 2003/0016872 A1 | 1/2003 | Sun | |
| 2003/0037074 A1 | 2/2003 | Dwork et al. | |
| 2003/0041126 A1 * | 2/2003 | Buford et al. | 709/220 |
| 2003/0088627 A1 | 5/2003 | Rothwell et al. | |
| 2003/0101227 A1 * | 5/2003 | Fink | 709/207 |
| 2003/0167311 A1 | 9/2003 | Kirsch | |
| 2003/0191969 A1 | 10/2003 | Katsikas | |
| 2003/0200541 A1 | 10/2003 | Cheng et al. | |
| 2003/0204569 A1 | 10/2003 | Andrews et al. | |
| 2003/0229672 A1 | 12/2003 | Kohn | |
| 2004/0003283 A1 | 1/2004 | Goodman et al. | |
| 2004/0015554 A1 | 1/2004 | Wilson | |
| 2004/0019650 A1 | 1/2004 | Auvenshine | |
| 2004/0019651 A1 | 1/2004 | Andaker | |
| 2004/0054887 A1 | 3/2004 | Paulsen, Jr. et al. | |
| 2004/0073617 A1 | 4/2004 | Milliken et al. | |
| 2004/0083270 A1 * | 4/2004 | Heckerman et al. | 709/207 |
| 2004/0093371 A1 | 5/2004 | Burrows et al. | |
| 2004/0095587 A1 * | 5/2004 | Brown et al. | 358/1.2 |
| 2004/0128355 A1 * | 7/2004 | Chao et al. | 709/206 |
| 2004/0139160 A1 | 7/2004 | Wallace et al. | |
| 2004/0139165 A1 | 7/2004 | McMillan et al. | |
| 2004/0148330 A1 * | 7/2004 | Alspector et al. | 709/200 |
| 2004/0177120 A1 | 9/2004 | Kirsch | |
| 2004/0199585 A1 | 10/2004 | Wang | |
| 2004/0199594 A1 | 10/2004 | Radatti et al. | |
| 2004/0210640 A1 | 10/2004 | Chadwick et al. | |
| 2004/0215977 A1 | 10/2004 | Goodman et al. | |
| 2004/0255122 A1 | 12/2004 | Ingerman et al. | |
| 2004/0260776 A1 | 12/2004 | Starbuck et al. | |
| 2004/0267886 A1 * | 12/2004 | Malik | 709/206 |
| 2005/0015455 A1 | 1/2005 | Liu | |
| 2005/0050150 A1 | 3/2005 | Dinkin | |
| 2005/0076084 A1 | 4/2005 | Loughmiller et al. | |
| 2005/0080855 A1 | 4/2005 | Murray | |
| 2005/0080889 A1 | 4/2005 | Malik et al. | |
| 2005/0091321 A1 | 4/2005 | Daniell et al. | |
| 2005/0097174 A1 | 5/2005 | Daniell | |
| 2005/0102366 A1 | 5/2005 | Kirsch | |
| 2005/0114452 A1 | 5/2005 | Prakash | |
| 2005/0120019 A1 | 6/2005 | Rigoutsos et al. | |
| 2005/0159136 A1 | 7/2005 | Rouse et al. | |
| 2005/0160148 A1 | 7/2005 | Yu | |
| 2005/0165895 A1 | 7/2005 | Rajan et al. | |
| 2005/0182735 A1 | 8/2005 | Zager et al. | |
| 2005/0188023 A1 | 8/2005 | Doan et al. | |
| 2005/0204159 A1 | 9/2005 | Davis et al. | |
| 2006/0031303 A1 | 2/2006 | Pang | |
| 2006/0031306 A1 | 2/2006 | Haverkos | |
| 2006/0036701 A1 | 2/2006 | Bulfer et al. | |
| 2006/0123083 A1 | 6/2006 | Goutte et al. | |
| 2006/0265498 A1 | 11/2006 | Turgeman et al. | |
| 2007/0101423 A1 | 5/2007 | Oliver et al. | |
| 2007/0130350 A1 | 6/2007 | Alperovitch et al. | |
| 2007/0130351 A1 | 6/2007 | Alperovitch et al. | |
| 2007/0133034 A1 | 6/2007 | Jindal et al. | |
| 2008/0104186 A1 | 5/2008 | Wieneke et al. | |

FOREIGN PATENT DOCUMENTS

| | | |
|---|---|---|
| EP | 0720333 A2 | 3/1996 |
| EP | 1376427 A2 | 2/2004 |
| EP | 1376427 A3 | 2/2004 |
| WO | WO9635994 | 11/1996 |
| WO | WO9967731 | 12/1999 |
| WO | WO02071286 | 12/2002 |
| WO | WO2004059506 | 7/2004 |

OTHER PUBLICATIONS

Allman, "Spam, Spam, Spam, Spam, Spam, the FTC, and Spam", ACM Queue, vol. 1, Issue 6, Sep. 2003, pp. 62-69.

Androutsopoulos, et al., "An Experimental Comparison of Naive Bayesian and Keyword-based Anti-spam Filtering with Personal Email Messages", Proceedings of the 23rd ACM SIGIR Conference, Jul. 2000, pp. 160-167.

Androutsopoulos, et al., "Learning to Filter Spam E-mail: A Comparison of a Naive Bayesian and a Memory-based Approach", 4th European Conference on Principles and Practice of Knowledge Discovery in Databases (PKDD2000), Sep. 2000, 12 pages.
Argamon, et al., "Routing Documents According to Style", First International Workshop on Innovative Internet Information Systems, Jun. 1998, 8 pages.
Balter, et al., "Bitfrost Inbox Organizer: Giving Users Control Over the Inbox", NordiCHI02, Oct. 2002, pp. 111-118.
Bowman, "Hotmail Spam Filters Block Outgoing E-Mail" CNET News.com, Jan. 18, 2001, 3 pages.
Breiman, et al., "Classification and Regression Trees", Book, Wadsworth & Brooks, Jan. 1984.
Broder, et al., "Syntactic Clustering of the Web", SRC Technical Note, Digital Corporation, Jul. 1997, 13 pages.
Byrne, "My Spamblock", Google, Jan. 19, 1997, 2 pages.
"Clearswift Announces the Most Complete e-Policy-Based Email Content Security Product for Service Providers", <<http://www.clearswift.com/news.item.aspx?ID=144>>, Dec. 2002, Business Wire.
Cohen, "Learning Rules that Classify E-Mail", Proceedings of the 1996 AAAI Spring Symposium on Machine Learning in Information Access, Aug. 1996, 8 pages.
Cranor, et al., "Spam" Communications of the ACM, Vo. 41, No. 8, Aug. 1998, pp. 74-83.
Cunningham, et al., "A Case-Based Approach to Spam Filtering That Can Track Concept Drift", Trinity College, Dublin, Department of Computer Science, ICCBRO3, Workshop on Long Lived CBR Systems, May 2003, 9 pages.
Dwork, et al., "Pricing Via Processing or Combatting Junk Mail", Presented at the 12th Annual International Cryptology Conference (CRYPTO92), Aug. 1992, pp. 1-11.
European Search Report, EP31087TE900, mailed Nov. 11, 2004.
European Search report dated Feb. 23, 2007, mailed Feb. 28, 2007 for European Patent Application No. 05105308, 4 pages.
European Search Report dated Apr. 6, 2006, mailed Apr. 6, 2006 for EP 04102242, 3 pages.
European Search Report dated Jul. 5, 2006, mailed Jul. 24, 2006 for European Application No. EP 06 01 2631, 3 pages.
European Search Report, Dated Jun. 9, 2005 for European Patent Application No. EP04011978, 12 pages.
European Search Report, dated Jun. 9, 2005, mailed Aug. 22, 2005 for European Patent Application No. EP04011978, 12 pages.
European Search Report, mailed Nov. 11, 2004, for EP31087TE9000.
Fawcett, "In Vivo Spam Filtering: A Challenge Problem for KDD", ACM SIGKDD Explorations, vol. 5, Issue 2, Dec. 2003, pp. 140-148.
Federal Trade Commission, "False Claims in Spam", A Report by the FTC's Division of Marketing Practices, retrieved from <<http://www.ftc.gov/reports/spam/030429spamreport.pdf>>, Apr. 2003, 16 pages.
Gee, "Using Latent Semantic Indexing to Filter Spam", ACM Symposium on Applied Computing (SAC), Mar. 2003, 5 pages.
Graham, "A Plan for Spam", retreived on Mar. 12, 2004 at <<http://www.paulgraham.com/spam.html>>, Aug. 2002, 13 pages.
Graham, "The Future of SPAM", Computer Journal, CSI Computer Security Institute, vol. 19, No. 1, Jan. 2003, 6 pages.
Hansell, "Internet Is Losing Ground in Battle Against Spam", retrieved on Apr. 22, 2003, <<http://www.nytimes.com/2003/04/22/business/technology-internet-is-losing-ground-in-battle-against-spam.html>>, The New York Times: Technology Section, Apr. 2003, 4 pages.
Hayes, "Spam, Spam, Spam, Lovely Spam", American Scientist, vol. 91, Jun. 2003, 6 pages.
Hildalgo, "Evaluating Cost-Sensitive Unsolicited Bulk Email Categorization", ACM Symposium on Applied Computing (SAC2002), Mar. 2002, pp. 615-620.
International Search Report dated Jan. 17, 2006, mailed Jan. 31, 2006, for PCT Application Serial No. PCT/US04/05501, 2 pages.
International Search Report dated Jan. 17, 2006, for PCT Application PCT/US04/05501, 2 pages.

Iwayama, et al., "Hierarchical Bayesian Clustering for Automatic Text Classification", Proceedings of the 14th International Joint Conference on Aritificial Intelligence (IJCAI95), Aug. 1995, pp. 1322-1327.
Joachims, "Text Categorization with Support Vector Machines: Learning with Many Relevant Features", LS-8 Report 23, Nov. 1997, 18 pages.
Joachims, "Transductive Inference for Text Classification Using Support Vector Machines", In Proceedings of the 16th International Conference on Machine Learning, Jun. 1999, pp. 200-209.
Koller, et al., "Hierarchically Classifying Documents Using Very Few Words", Proceedings of the 14th International Conference on Machine Learning (ICML97), Jul. 1997, 9 pages.
Koller, et al., "Toward Optimal Feature Selection",,Proceedings of the 13th International Conference on Machine Learning, Jul. 1996, 9 pages.
Lewis, et al., "A Comparision fo Two Learning Algorithms for Text Categorization", Third Annual Symposium on Document Analysis and Information Retrieval, Apr. 1994, pp. 81-93.
Lewis, "An Evaluation of Phrasal and Clustered Representations on a Text Categorization Task", 15th Annual International SIGIR92, Jun. 1992, pp. 37-50.
Lewis, "Representation and Learning in Information Retreival", University of Massachusetts, Feb. 1992, 221 pages.
Li, et al., "Classification of Text Documents", Department of Computer Science and Engineering, Michigan State University, East Lansing, Michigan, The Computer Journal, vol. 41, No. 8, Aug. 1998, pp. 537-546.
Li, et al., "Secure Human-Computer Identification Against Peeping Attacks (SecHCI): A Survey", Microsoft Research Technical Report, Jan. 2003, 53 pages.
Madigan, "Statistics and the War on Spam", Rutgers University, in Statistics: A Guide to the Unknown, Deb Nolan (Editor), 2004, pp. 135-147.
Manco, et al., "Towards an Adaptive Mail Classifier", In Proceedings of the Italian Association for Artificial Intelligence Workshop, Sep. 2002, 12 pages.
Massey, et al., "Learning Spam: Simple Techniques for Freely-Available Software", Proceedings of the Freenix Track 2003, Usenix Annual Technical Conference, Jun. 2003, pp. 63-76.
Mimoso, "Quick Takes: Image Analysis, Filtering Comes to E-Mail Security", retrieved from <<http://searchsecurity.techtarget.com/originalContent.html>>, Feb. 2002.
Mitchell, "Machine Learning", Carnegie Mellon University, Bayesian Learning, Chapter 6, Mar. 1997, pp. 180-184.
Mock, "An Experimental Framework for Email Categorization and Management", Proceedings of the 24th Annual International ACM SIGIR Conference on Research and Developoment in Information Retrieval, Sep. 2001, pp. 392-393.
OBrien, et al., "Spam Filters: Bayes vs. Chi-squared Letters vs. Words", Proceedings of the 1st International Symposium on Information and Communication Technologies, Sep. 2003, pp. 291-296.
Palme, et al., "Issues When Designing Filters in Messaging Systems", Department of Computer and Systems Sciences, Stockholm University, Royal Institute of Technology, Skeppargarten 73, S-115 30, Stockholm, Sweden, Computer Communications, vol. 19, No. 2, Feb. 1996, pp. 95-101.
Pantel, et al., "SpamCop: A Spam Classification and Organization Program", In Proceedings of AAAI 1998 Workshop on Learning for Text Categorization, Mar. 1998, 8 pages.
Partial European Search Report, mailed Jun. 21, 2005 for EP05100847, 5 pages.
Partial European Search Report, EP05100847, mailed Jun. 21, 2005, 5 pages.
Quinlan, "C4.5: Programs for Machine Learning", Book, Morgan Kaufmann, Oct. 1992.
Rennie, "Ifile: An Application of Machine Learning to E-Mail Filtering", Proceedings of the 6th ACM SIGKDD International Conference on Knowledge Discovery and Data Mining (KDD-2000), Workshop on Text Mining, Aug. 2000, 6 pages.
Rosen, "E-mail Classifiers in the Haystack Framework", Massachusetts Institute of Technology, Feb. 2003.

Sahami, et al., "A Bayesian Approach to Filtering Junk E-Mail", AAAI Workshop on Learning for Text Categorization, AAAI Technical Report WS-98-05, Jul. 1998, 8 pages.

Sahami, "Learning Limited Dependence Bayesian Classifiers", Proceedings of the Second Internationsl Conference on Knowledge Discovery and Data Mining (KDD96), Aug. 1996, pp. 335-338.

Schutze, et al., "A Comparison of Classifiers and Document Representations for the Routing Problem", Proceedings of the 18th Annual International ACM SIGIR Conference on Research Development in Information Retrieval, Jul. 1995, pp. 229-237.

Sebastiani, "Machine Learning in Automated Text Categorization", ACM Computing Serveys, vol. 34, Issue 1, Mar. 2002, pp. 1-47.

Segal, et al., "SwiftFile: An Intelligent Assitant for Organizing E-Mail", IBM Thomas J. Watson Research Center, AAAI Technical Report, Mar. 2000, 6 pages.

Simard, et al., "Using Character Recognition and Segmenation to Tell Computer from Humans", IEEE Computer Society International Conference on Document Analysis and Recognition (ICDAR), Aug. 2003, pp. 413-423.

Skoll, "How to Make Sure a Human is Sending you Mail", Google, Nov. 17, 1996, 2 pages.

Spertus, "Smokey: Automatic Recognition of Hostile Messages", Proceedings of the Conference on Innovative Applications in Artificial Intelligence (IAAI ), Jul. 1997, 8 pages.

"Stop in the Name of Spam", Communications of the ACM, vol. 41, No. 11, Nov. 1998, pp. 11-14.

Takkinen, et al., "CAFE: A Conceptual Model for Managing Information in Electronic Mail", Proceedings of the 31st Hawaii International Conference on System Science, vol. 5, Jan. 1998, 10 pages.

Turner, et al., "Controlling Spam Through Lightweight Currency", In Proceedings of the Hawaii International Conference on Computer Sciences, Jan. 2004, 9 pages.

Turner, et al., "Payment-based Email", 5th International Conference on Software Engineering, Artificial Intelligence, Networking and Parallel Distributed Computing, Jun. 2004, 7 pages.

U.S. Appl. No. 09/497,992, filed Feb. 4, 2000, Mailer.

U.S. Appl. No. 09/893,941, filed Jun. 28, 2001, Horvitz, et al.

U.S. Appl. No. 10/180,565, filed Jun. 26, 2002, Goodman, et al.

U.S. Appl. No. 10/208,150, filed Jul. 29, 2002, Andaker.

U.S. Appl. No. 10/278,591, filed Oct. 23, 2002, Heckerman, et al.

U.S. Appl. No. 10/291,260, filed Nov. 8, 2002, Burrows, et al.

White, "How Computers Work", QUE Publishing, 2004, pp. 238-239.

Wong, "Preventing Spam and Relays", Linux Journal, Issue 56, Dec. 1998, 6 pages.

Wong, "SPF Overview" Linux Journal, Issue 120, Apr. 2004, 6 pages.

Written Opinion of the International Preliminary Examining Authority mailed Nov. 30, 2005 for PCT/US03/41526, 5 pages.

Written Opinion of the International Preliminary Examining Authority mailed Nov. 30, 2005, for PCT/US03/41526, 5 pages.

Wu, et al., "A New Anti-Spam Filter Based on Data Mining and Analysis fo Email Security", Proceedings of the SPIE Data Mining and Knowledge Discovery Theory, Tools and Technology V, vol. 5098, Apr. 2003, pp. 147-154.

Yang, et al., "A Comparitive Study on Feature Selection in Text Categorization", Proceedings of the 14th International Conference on Machine Learning (ICML97), Jul. 1997, 9 pages.

Yang, et al., "An Example-Based Mapping Method for Text Categorization and Retrieval", ACM Transactions on Information Systems, vol. 12, No. 3, Jul. 1994, pp. 252-277.

* cited by examiner

MESSAGE RENDERING FOR IDENTIFICATION OF CONTENT FEATURES

CROSS-REFERENCE TO RELATED APPLICATIONS

This application is a divisional of U.S. patent application Ser. No. 10/428,649, filed on May 2, 2003, and which issued as U.S. Pat. No. 7,483,947 on Jan. 27, 2009, entitled, "MESSAGE RENDERING FOR IDENTIFICATION OF CONTENT FEATURES G", the entirety of which is incorporated herein by reference.

This application is related to the following patent(s) and patent application(s), the entirety of which are incorporated herein by reference: U.S. Pat. No. 6,161,130 by Horvitz et al., entitled "TECHNIQUE WHICH UTILIZES A PROBABILISTIC CLASSIFIER TO DETECT JUNK E-MAIL BY AUTOMATICALLY UPDATING A TRAINING AND RETRAINING THE CLASSIFIER BASED ON THE UPDATING TRAINING SET", and which issued on Dec. 12, 2000; U.S. patent application Ser. No. 09/448,408 entitled "CLASSIFICATION SYSTEM TRAINER EMPLOYING MAXIMUM MARGIN BACK-PROPAGATION WITH PROBABILISTIC OUTPUTS" filed on Nov. 23, 1999, and which issued as U.S. Pat. No. 6,728,690 on Apr. 27, 2004; U.S. patent application Ser. No. 10/278,591 entitled "METHOD AND SYSTEM FOR IDENTIFYING JUNK E-MAIL" filed on Oct. 23, 2002; and U.S. patent application Ser. No. 10/374,005 entitled "ADAPTIVE JUNK MESSAGE FILTERING SYSTEM" filed on Feb. 25, 2003, and which issued as U.S. Pat. No. 7,249,162 on Jul. 24, 2007.

TECHNICAL FIELD

This invention is related to message filtering, and more specifically, to a technique for determining the content features of a message.

BACKGROUND OF THE INVENTION

The advent of global communications networks such as the Internet has presented commercial opportunities for reaching vast numbers of potential customers. Electronic messaging, and particularly electronic mail ("e-mail"), is becoming increasingly pervasive as a means of disseminating unwanted advertisements and promotions (also denoted as "spam") to network users.

The Radicati Group, Inc., a consulting and market research firm, estimates that as of August 2002, two billion junk (or spam) e-mail messages are being sent every day. This number is expected to triple every two years. More and more people are becoming inconvenienced and offended by the junk e-mail that they receive. As such, junk e-mail is now or soon will become the principal perceived threat to trustworthy computing.

A key technique utilized for thwarting junk e-mail is content filtering. A proven technique for filtering is based upon a machine learning approach. Machine learning filters assign to an incoming message a probability of the message content being junk. In this approach, content features are extracted from two classes of example e-mail (i.e., junk and non junk e-mails), and a learning filter is applied probabilistically to discriminate the two classes. Since many of the features of e-mail are related to content (e.g., words and phrases in the subject and body), these filters are also commonly referred to as "content-based filters".

The goal of a spammer is to make changes in (or "cloak") their message content so that junk filters are unable to detect that the e-mail is spam. This is often done to prevent the detection of phrases or words commonly associated with spam content. Spammers also frequently make small changes to individual e-mail messages when executing mass mailings on the order of, for example, 100,000 messages or more. Making subtle changes to individual messages in a mass mailing significantly reduces the probability that junk filters will detect that the same message is being sent to large groups of users.

The following techniques are some examples used by spammers, not necessarily to mislead the recipient reader, since the tricks are removed or resolved prior to the reader perceiving the message, but to prevent junk filters from successfully matching words, phrases, or even the entire e-mail message: HTML comments, which are those comments added to the HTML version of the message body, cause problems for the spam filter, and are removed prior to the e-mail message being viewed by the reader; declarative decoration content is that content that has little or no affect on the e-mail text, e.g., HTML tags, yet changes the message; encoding occurs where the message text is changed by using special types of encoding, e.g., foreign language characters; and HTML positioning, where the e-mail message is created in such a way that visually, the order of the text is changed from that which is ultimately perceived user, since HTML can be used to change the text position.

What is needed is a technique that solves the aforementioned problem by resolving obfuscating content of messages prior to filtering

SUMMARY OF THE INVENTION

The present invention disclosed and claimed herein, in one aspect thereof, comprises a pre-processing technique for detecting and removing obfuscating clutter from the subject and/or body of a message, e.g., e-mail, prior to filtering of the message, to identify junk messages commonly referred to as SPAM. The technique utilizes the powerful features built into an HTML rendering engine to strip the HTML instructions for all non-substantive aspects of the message. Pre-processing includes pre-rendering of the message into a final format, which final format is that which is displayed by the rendering engine to the user. The final format message is then converted to a text-only format to remove graphics, color, non-text decoration, and spacing that cannot be rendered as ASCII-style or Unicode-style characters. The result is essentially to reduce each message to its common denominator essentials so that the junk mail filter can view each message on an equal basis.

To the accomplishment of the foregoing and related ends, certain illustrative aspects of the invention are described herein in connection with the following description and the annexed drawings. These aspects are indicative, however, of but a few of the various ways in which the principles of the invention may be employed and the present invention is intended to include all such aspects and their equivalents. Other advantages and novel features of the invention may become apparent from the following detailed description of the invention when considered in conjunction with the drawings.

DETAILED DESCRIPTION OF THE INVENTION

The present invention is now described with reference to the drawings, wherein like reference numerals are used to refer to like elements throughout. In the following description, for purposes of explanation, numerous specific details are set forth in order to provide a thorough understanding of the present invention. It may be evident, however, that the present invention may be practiced without these specific details. In other instances, well-known structures and devices are shown in block diagram form in order to facilitate describing the present invention.

As used in this application, the terms "component" and "system" are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers.

As used herein, the term "inference" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

Figure 1:
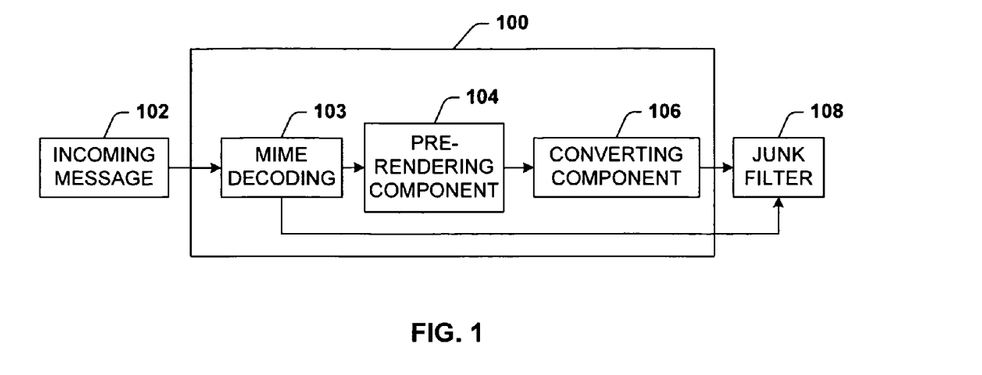
FIG. 1 illustrates a block diagram of pre-processing algorithm in accordance with the present invention.

Referring now to FIG. 1, there is illustrated a block diagram of pre-processing algorithm 100 in accordance with the present invention. When a message 102 is received, the pre-processing algorithm 100 utilizes a MIME (Multipurpose Internet Mail Extensions) decoding component 103 that extracts any MIME-encoded parts of the message. MIME is a standard format for including non-text information in a message (e.g., an Internet e-mail message), thereby supporting the transmission of mixed-media messages across TCP/IP networks. The MIME protocol covers binary, audio, and video data, and also includes foreign language text (e.g., Russian and Chinese) that cannot be represented in plain ASCII (American Standard Code for Information Interchange) code. The MIME decoded message is sent to a pre-rendering component 104 that renders the message in a final format that the user will typically perceive when displayed on a computer display. The message 102 is rendered in the same way that it would be rendered for viewing by the client user. Rendering applies the appropriate decoding, removal of comments, applies the decoration, skips invalid decoration commands, and applies the final positioning. Rendering is performed by an HTML (HyperText Markup Language) rendering engine that facilitates stripping of the HTML instructions for all non-substantive aspects of the message 102. Thus, the text is rendered from the message and the raw HTML features of the message are exposed and analyzed.

Once rendered, the message in final format is then passed to a converting component 106 that converts the final format message into a text-only format. The conversion process removes graphics, colors, non-text decoration, and spacing, all of which is content that cannot be rendered as ASCII-style or Unicode-style characters. The conversion process of the converting component 106 renders words and phrases of the message into text form that the user would see if displayed on the display. The result is essentially to reduce each message to its common denominator essentials so that when passed to a junk mail filter 108, each message can be junk processed on an equal basis. The unrendered text output from 103 is also passed to the junk mail filter 108, so that the junk mail filter can use characteristics of the unrendered text, such as presence of certain HTML commands, as additional inputs.

Note that the rendering engine utilized by the pre-processing algorithm may be the same rendering engine used in displaying the message to the user. Thus the pre-processing algorithm is programmed to access the rendering engine to perform the pre-rendering aspect of the present invention. Where the message is determined not to be spam, the rendering engine is again used to display the message to the user when accessed for such purpose from the user inbox.

Figure 2:
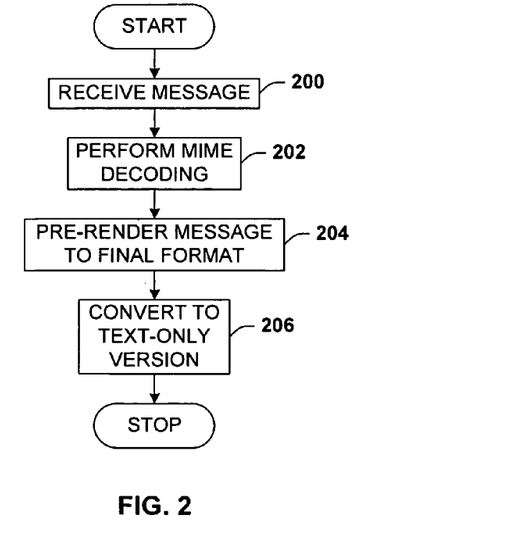
FIG. 2 illustrates a flow chart of the pre-processing algorithm for the present invention.

Referring now to FIG. 2, there is illustrated a flow chart of the pre-processing algorithm for the present invention. While, for purposes of simplicity of explanation, the methodologies are shown herein in the form of flow charts and described as a series of acts, it is to be understood and appreciated that the present invention is not limited by the order of acts, as some acts may, in accordance with the present invention, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the present invention.

Flow begins at a Start block and proceeds to 200 where the incoming message is received into pre-processing algorithm. At 202, MIME decoding is performed on any portion of the message that it currently MIME encoded. At 204, the message is pre-rendered using the display engine to apply the appropriate decoding, removal of comments, decoration, to skip invalid decoration commands, and apply the final text positioning. The rendered message is then converted to text, in 206, or some other fundamental format that can be utilized for all message types. Flow then reaches a Stop block. As indicated hereinabove, once converted, the rendered text from the converting component and unrendered text from the MIME decoding component are passed to the junk filter as inputs.

Following are examples of some of the text obfuscating techniques spammers use to confuse a junk filter. In this scenario, the junk filter found that the phrases "Rich" and "www.getrichquick.com" need to be identified in order to have a high degree of certainty of determining that the message is junk mail. Here are examples of how spammers obfuscate text, with the original shown "before", and then the obfuscated text shown "after." The rendered version is the "before" version.

HTML Comment Example

| Before: | Get Rich quick!!! Visit www.getrichquick.com |
|---|---|
| After: | Get R<!-- -->ich quick!!! Visit www.getrich<!-- -->quick.com |

Declarative Decoration Example

| Before: | Get Rich quick!!! Visit www.getrichquick.com |
|---|---|
| After: | Get R<B>i</B>ch quick!!! Visit www.getrich<FOO>qui</FOO>ck.com |

Encoding Example

| Before: | further mailings, please take <a HREF="mailto:remove1635@xwqeorg" |
|---|---|
| After: | further mail= ings, please take <a HREF=3D"mailto:remove1635@xwqeorg" |

Positining Example

| Before: | Get Rich quick!!! Visit www.getrichquick.com |
|---|---|
| After: | Get Ri quick.com <DIV STYLE="position: relative; left: −153>ch quick!!! Visit www.getrich</DIV> |

As indicated hereinabove, once the message has been rendered, there are many additional improvements for spam filtering that can be made. These include examining the size, color, font, and formatting of various words. For instance, if a word or character is rendered as white, or very light grey text on a white background, the word or character is essentially invisible. A spammer could use this technique in various ways. For instance, the example GetxRichxQuick (where a greyed letter "x" is placed interstitial to the words) makes it difficult for the filter to determine if the text is spam. The grey "x" may be made invisible when changing the color to white (i.e., white on a white background). In either case, the spam filter will be confused by the presence of these letters.

Contrariwise, consider a spam message including "non-spam-like" words, such as "weather", "tomorrow", and "cancer". If these words are included in a very small font size, or white-on-white color, the words may make the message less spam-like according to filters, and users would not see them at all. In addition, certain words in spam messages are likely to occur in a large font size, and/or brightly colored (here, in red), and underlined, such as the following:

(Click here to buy this!).

whereas other words are likely to occur small in font size (e.g., size 6) and/or dimmed (using a grey font color), such as the following:

(click here to unsubscribe).

Furthermore, words occurring in links (e.g., unsubscribe, and free) may be more important than words occurring elsewhere.

Thus after pre-rendering to the final format, and conversion to text-only format, factors such as the text size, color, font, formatting, and/or inclusion of the text inside of a link, may be used to change the weight of the word in the filter. Invisible or nearly invisible words and characters (e.g., letters) should be removed, and a check performed for certain words or phrases that are rendered to include separately or in combination with at least any of the following: smaller or larger in font size, dimmer or brighter, with special formatting, or inside of links. In addition, it is useful to look at the words after rendering, as well as for any embedded tags themselves. For instance, the fact that a message contains a comment may be a useful clue that it is or is not a spam message. Thus character, word, and/or text segmentation may be performed based upon features of the character or groups of characters (that form words and text) such as color, visibility.

When considering image content in a message, a compressed image may look very different than an uncompressed image. Thus the image is decompressed before being analyzed for image indicia associated with junk messages. Where multiple images are included in the message to convey or form a single spam image, these multiple images are then decompressed and rendered next to each other prior to analysis in order to determine what if any image content is directed to spam.

The subject invention (e.g., in learning weights) can employ various artificial intelligence or machine learning based schemes for carrying out various aspects of the subject invention. For example, a process for determining the weight of a word can be facilitated via an automatic classification system and process. Such classification can employ a probabilistic and/or statistical-based analysis (e.g., factoring into the analysis utilities and costs) to prognose or infer an action that a user desires to be automatically performed. For example, a support vector machine (SVM) classifier can be employed. Other classification approaches that may be used include Bayesian networks, decision trees, and probabilistic classification models each of which provide different patterns of independence. Classification as used herein also is inclusive of statistical regression that is utilized to develop models of priority.

As will be readily appreciated from the subject specification, the subject invention can employ classifiers that are explicitly trained (e.g., via training data) as well as implicitly trained (e.g., via observing user behavior, receiving extrinsic information) so that the classifier(s) is used to automatically determine according to a predetermined criteria which character, word, or text to associate a given weight. The criteria can include, but are not limited to, the frequency of use of the character, word, or text, the number of times the character, word, or text is associated with a message that is ultimately determined to be junk, etc. For example, with respect to SVMs which are well understood—it is to be appreciated that other classifier models may also be utilized such as Naive Bayes, Bayes Nets, decision trees and other learning models—SVMs are trained via a learning or training phase within a classifier constructor and feature selection module. A classifier is a function that maps an input attribute vector, x=(x1, x2, x3, x4, xn), to a confidence that the input belongs to a class—that is, f(x)=confidence(x, class). In the case of text based spam filtering classification, for example, attributes are words or phrases or other data-specific attributes derived from the words (e.g., parts of speech, presence of key terms), and the classes are categories such as spam or not spam.

Figure 3:
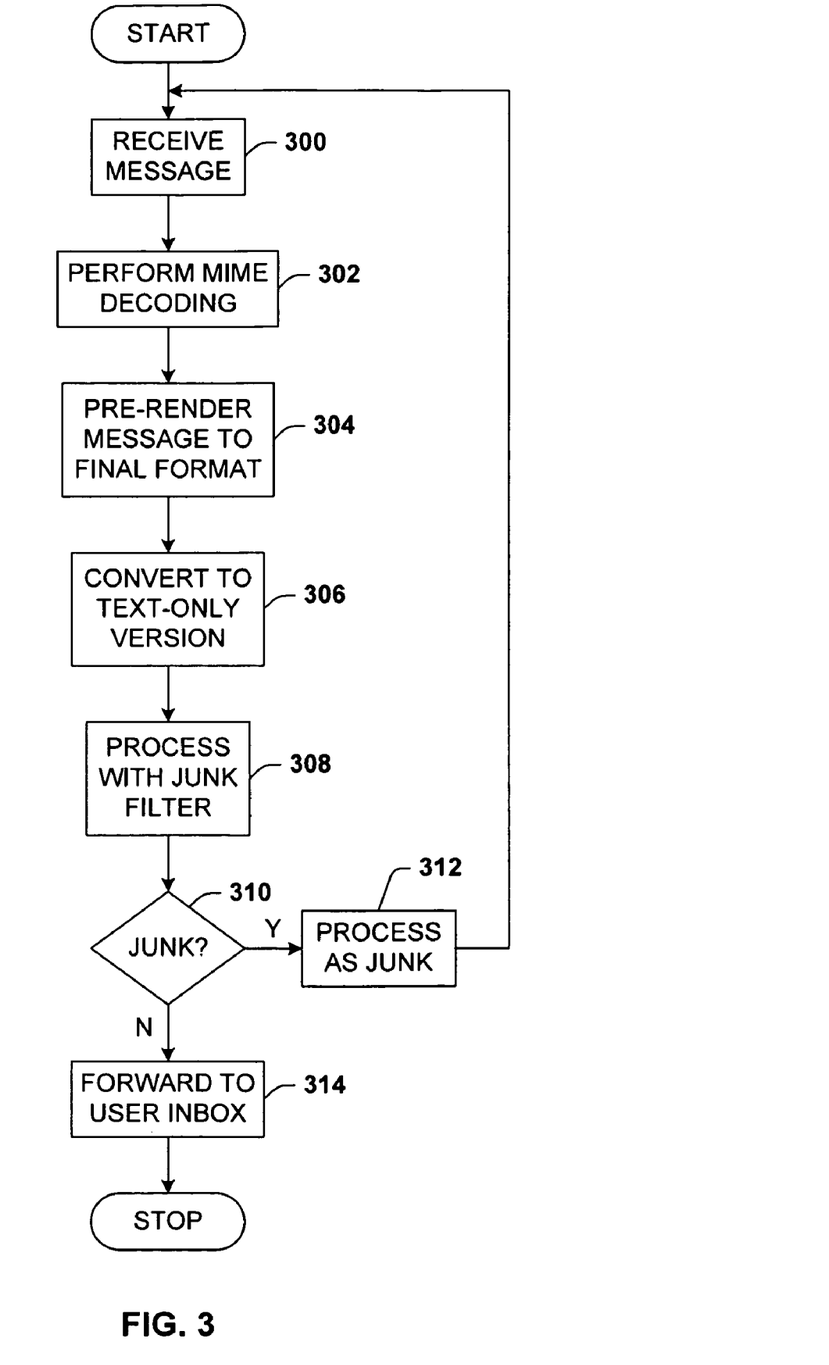
FIG. 3 illustrates a flow chart of the methodology for using the preprocessing algorithm of the present invention with a junk filter.

Other similar techniques for learning the weights may be employed. For example, the perceptron algorithm offers a simple methodology for training these weights, although this method may be more computationally time-consuming than the SVM Referring now to FIG. 3, there is illustrated a flow chart of the methodology for using the preprocessing algorithm of the present invention with a junk filter. Flow begins at a Start block and proceeds to 300 where the incoming message is received into the pre-processing algorithm. At 302, MIME decoding is performed on those parts of the message that are MIME encoded. At 304, the message is pre-rendered using the display engine to apply the appropriate decoding, removal of comments, decoration, to skip invalid decoration commands, and apply the final text positioning. The rendered message is then converted to text, in 306, or some other fundamental format that can be utilized for all message types. At 308, the text is processed with a junk filter to determine if the message is junk. This is accomplished by determining what, if any, textual content of the current message has in the past been associated with junk messages. If YES, the message contains junk content, and at 312, the message is processed as junk. Flow is then back to the input of 300 to receive and process the next message. Of course, message pre-processing of a second received message may occur while filtering of a first received message is being performed. On the other hand, if the message is determined not to be junk, flow is to 314, where the message is forwarded to a user inbox for later access. Flow then reaches a Stop block. As indicated previously, the unrendered message may also be used as an input to the junk filter.

Figure 4A:
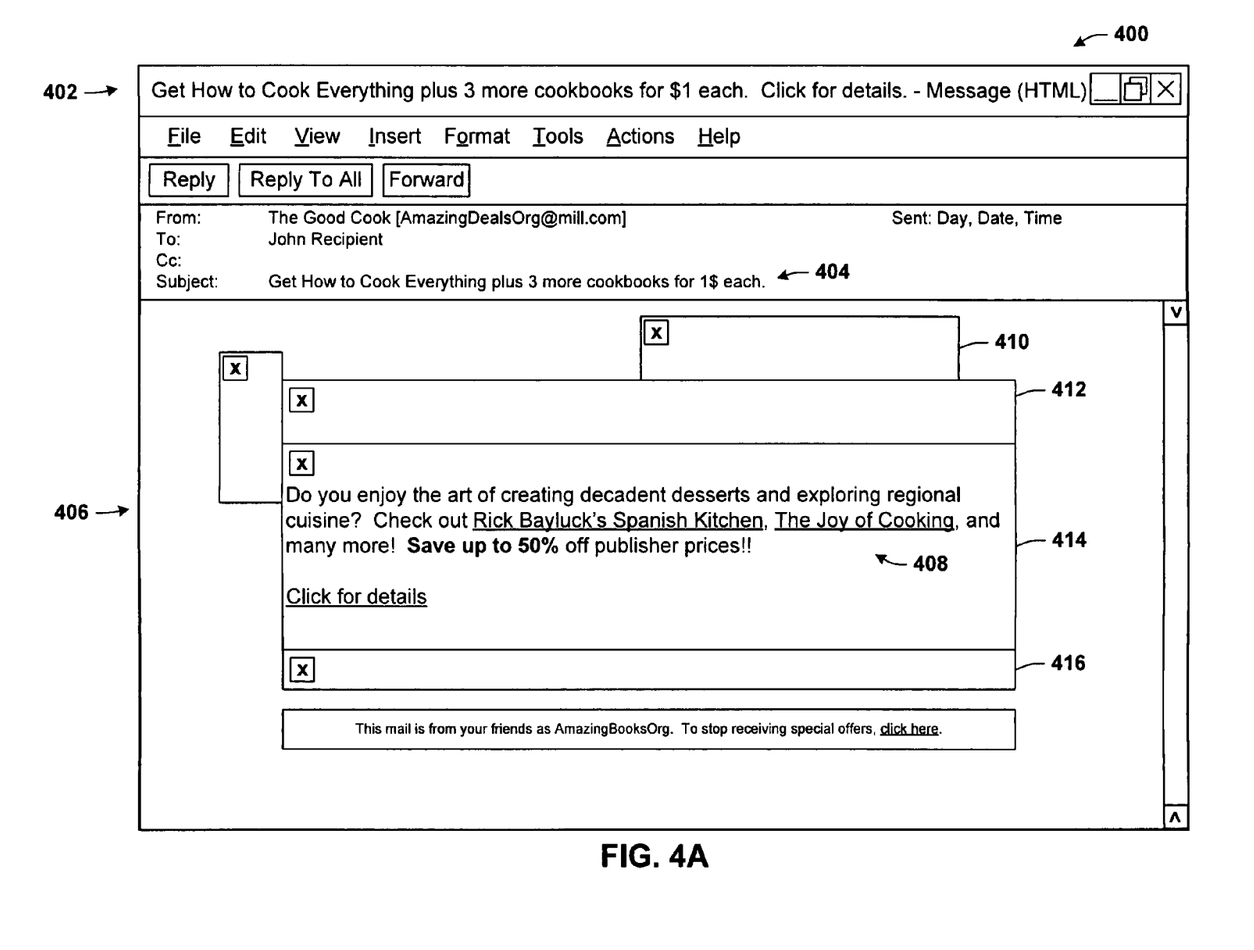
FIG. 4A illustrates a message page that utilizes image chaining.
Figure 4B:
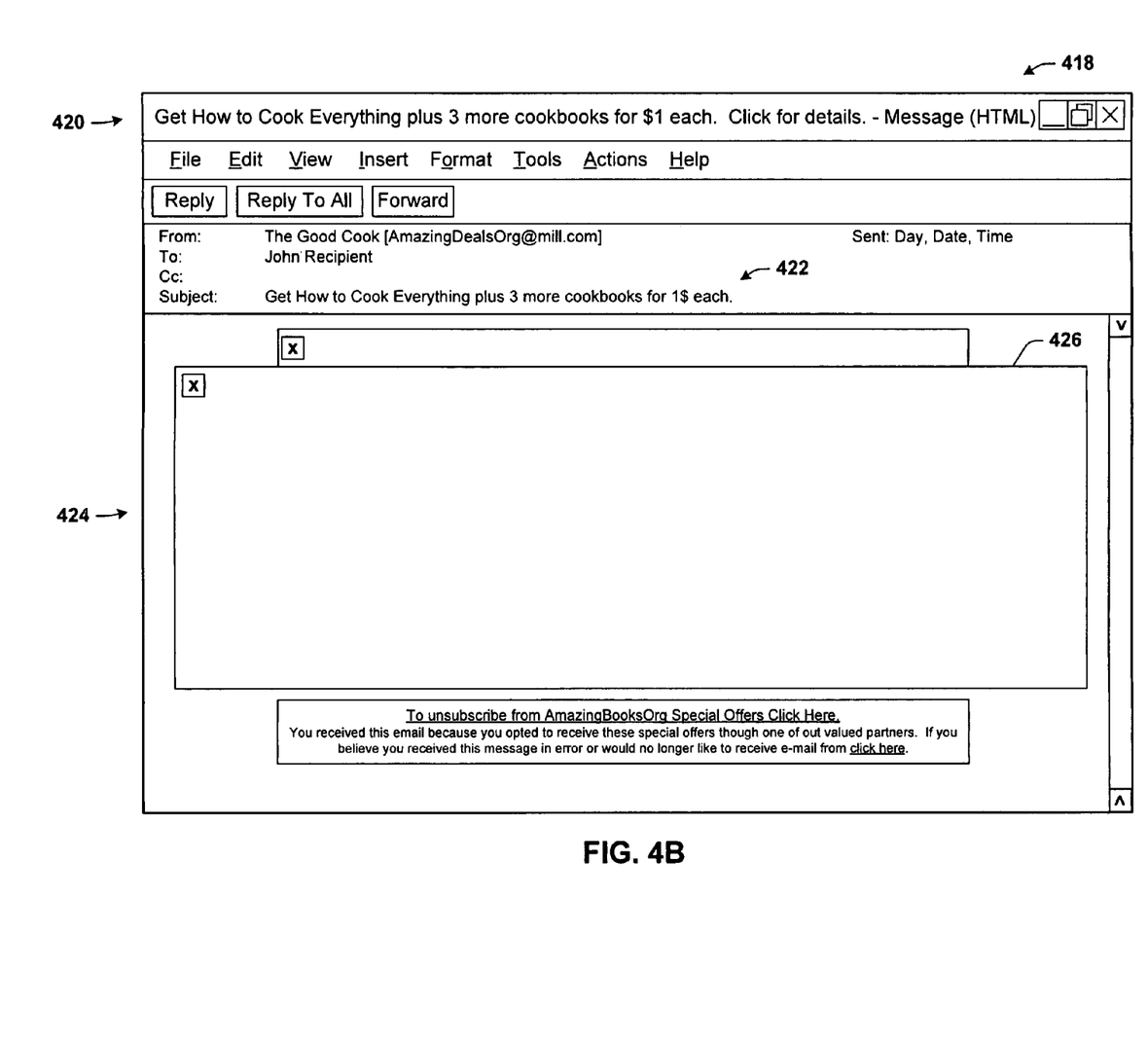
FIG. 4B illustrates a message page that utilizes a large image and manipulated text content.

Referring now to FIG. 4A and FIG. 4B, there are illustrated exemplary spam messages utilizing image and text obfuscation techniques. Spammers like to use images rather than text for a variety reasons, including that it is much harder and more time consuming to analyze images than text. The disclosed architecture may utilize a variety of techniques to expose features based on images, including but not limited to, the number of images, the location of the image (embedded in the message or externally linked), and the type of the image formats (JPGs or GIFs, etc.).

Moreover, the size of the images may be detected with minimal processing. For instance, for images embedded in the message, only minimal parsing is necessary to determine the image size, in terms of its X-Y dimensions. Such dimensions may be utilized in determining whether the image size matches those commonly produced by digital cameras, which may infer that the message is personal rather than spam. Furthermore, features may be included in the algorithm for calculating the size of the image in bytes, a calculation that can be easily computed. Other aspects for determining whether an image may be related to junk messages include the number of images, and the total area of the images. An important feature associated with the use of images in junk messages is whether the images in the text link to somewhere else, since spammers typically need external links. Thus the combination of an image and a link may be used to trigger tagging of the message as junk.

In FIG. 4A, image chaining is illustrated. A message page 400 includes a banner subject field 402 that displays to the viewer the subject line information 404 in larger font. A main body area 406 of the message page 400 includes a message text 408 that the sender wishes the recipient to view. However, in order to further confuse the junk mail filter, the main body area 406 includes a number of individual images (410, 412, 414, and 416) of varying sizes and shapes, and embeds the images in the main body area 406. In this embodiment, the message text 408 is part of the image 414.

FIG. 4B illustrates a message page 418 using a large image. The message page 418 includes a banner subject field 420 that displays to the viewer the subject line information 422 in larger font. A main body area 424 of the message page 418 includes a large image 426 that the sender wishes the recipient to view.

Junk filters may be designed to create a unique hash of a message or an image within the message. Thus when the filter is trained on what is determined to be a junk message, the filter would like to use the same hash to identify the same spam message that may be sent later. Spammers attempt to trick the filter by chaining more than one image next to another in lieu of one large image. Spammers can then divide up the large image differently over time in order to prevent the new hash derived by the junk filter for the recently received message from matching the hash that was previously derived on this same type of message. The disclosed architecture solves this problem by generating the hash based upon the image that results after the display engine finishes rendering all of the images together.

Again, junk filters may be designed to create a unique hash of an image within the message. Thus when the filter is trained on what is determined to be a junk message or many junk messages, the filter would like to use the same hash to identify the same spam message(s) that may be sent later. Spammers attempt to trick the filter by modifying meaningless values within a compressed image, which allows the resulting image to be the exact same image, but the compressed image will have a different hash.

The disclosed architecture solves this problem by generating a hash based upon the image after it has been decompressed in the display pipeline. Furthermore, spammer tricks can be detected by the architecture of the present invention generating the hash of the compressed and decompressed image. Thus if the uncompressed hash for the image has been logged before, but it does not map to the associated compressed hash, then the compressed image has meaningless changes, and will be tagged as a junk message.

Figure 5:
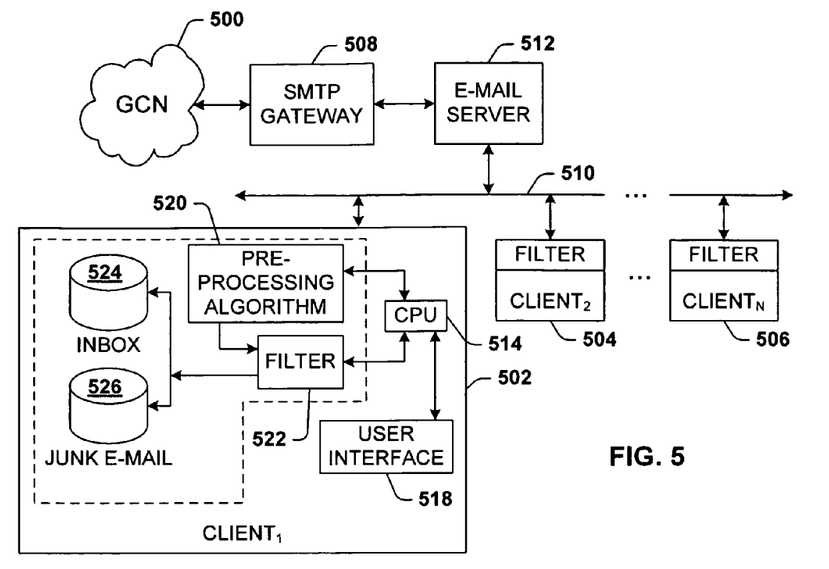
FIG. 5 illustrates a general block diagram of a mail architecture that utilizes the disclosed pre-processing technique.

Referring now to FIG. 5, there is illustrated a general block diagram of a mail architecture that utilizes the disclosed preprocessing technique. A network 500 is provided to facilitate communication of e-mail to and from one or more clients 502, 504 and 506 (also denoted as Client1, Client2, . . . , ClientN). The network 500 may be a global communication network (GCN) such as the Internet, or a WAN (Wide Area Network), LAN (Local Area Network), or any other network architecture. In this particular implementation, an SMTP (Simple Mail Transport Protocol) gateway server 508 interfaces to the network 500 to provide SMTP services to a LAN 510. An e-mail server 512 operatively disposed on the LAN 510 interfaces to the gateway 508 to control and process incoming and outgoing e-mail of the clients 502, 504 and 506, which clients 502, 504 and 506 are also disposed on the LAN 510 to access at least the mail services provided thereon.

The client 502 includes a central processing unit (CPU) 514 that controls all client processes. The CPU 514 executes an algorithm operable according instructions for providing any of the one or more pre-processing and filtering functions described hereinabove. A user interface 518 is provided to facilitate communication with the CPU 514 and client operating system such that the user can at least interact to configure the pre-processing and filter settings, and access the e-mail.

The client 502 also includes at least a pre-processing component 520 (similar to the algorithm component 100) and a filter 522 (similar to the filter 108). The client 502 also includes an e-mail inbox storage location (or folder) 524 for receiving filtered e-mail from the filter 522. A second e-mail storage location (or folder) 526 may be provided for accommodating junk mail that is determined by the filter 522 to be junk mail and chooses to store therein, although this may also be a trash folder. The remaining clients, Client2, . . . , ClientN, may also be operable to host and execute the disclosed pre-processing algorithm of the present invention.

It is to be appreciated that the filter 522, and associated filters of the clients 504 through client 506 may incorporate personalizable filters. This means that some of the user's data is collected, for instance the data that the user may hand classify as junk or non-junk, as well as other data, such as messages that are replied to and thus, are not hand classified. This additional data may then be used to retrain the filter. This can include the original training data, or one may bias towards a filter that gives similar results to the original training data so that even with only a few hand-classified messages, a good filter is till obtainable.

A personalized filter has a number of advantages. First, it makes it much harder for spammers to defeat filters, because every user has a different filter. Second, the filter does a better job of learning what words are in the personal mail of the user. For instance, there's a lot of spam about mortgages these days, but if the user is a real estate agent, the user may not want mortgage mail to be filtered. On the other hand, if the user is a real estate agent, it might be learned that the mail includes words such as "house", "sale", and "location", so that if someone sends an e-mail about a "house for sale in a really sexy location", it will not get filtered, despite the word "sexy." Personalized filters do a better job of catching all of an associated user's mail, and can be set to catch more spam.

Figure 6:
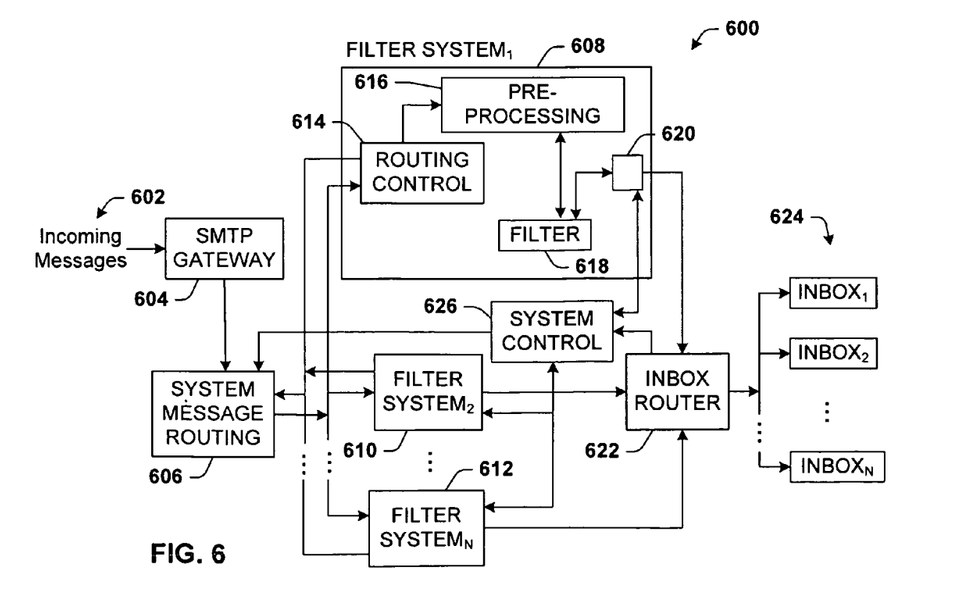
FIG. 6 illustrates an alternative embodiment of a large-scale filtering system utilizing the pre-processing algorithm of the present invention.

Referring now to FIG. 6, there is illustrated an alternative embodiment of a large-scale filtering system 600 utilizing the pre-processing algorithm of the present invention. In more robust implementations where message filtering is performed on a mass scale by system-wide mail systems, e.g., an Internet service provider, multiple filtering systems may be employed to process a large number of incoming messages. Hence, a large number of incoming messages 602 are received and addressed to many different user destinations. The messages 602 enter the provider system via, for example, an SMTP gateway 604 and are then transmitted to a system message routing component 606 for routing to various filter systems 608, 610, and 612 (also denoted respectively as Filter System1, Filter System2, . . . , Filter SystemN).

Each filter system (608, 610, and 612) includes a routing control component, a pre-processing component, a filter, and an output buffer. Thus the filter system 608 includes a routing control component 614 for routing messages to the pre-processing component 616. The routing control component 614 also provides feedback to the system message routing component 606 to signal if the routing control 614 is ready to receive further messages for filter processing. The output of the pre-processing component 616 connects to a filter 618 to process the text-only message content for junk-type characters and text. The output of the filter 618 connects to an output buffer 620 for temporarily storing messages prior to the messages being transmitted to a user inbox routing component 622. The user inbox routing component 622 interrogates each message received from the output buffer 620 of the filter system 608 for the user destination address, and routes the message to the appropriate user inbox of a plurality of user inboxes 624 (also denoted Inbox1, Inbox2, . . . , InboxN)

The system message routing component 606 includes a load balancing capability to route messages between the filter systems (608, 610, and 612) according to the availability of a bandwidth of the filters systems (608, 610, and 612) to accommodate message processing. Thus if an incoming message queue (not shown, but part of the routing component 614) of the first filter system 608 is backed up and cannot accommodate the throughput needed for the system 600, status information of this queue is fed back to the system routing component 606 from the routing control component 614 so that incoming messages 602 are then routed to the other filter systems (610 and 612) until the incoming queue of the system 614 is capable of receiving further messages. Each of the remaining filter systems (610 and 612) includes this incoming queue feedback capability such that the system routing component 606 can process message load handling between all available filter systems Filter System1, Filter System2, . . . , Filter SystemN.

A system control component 626 interfaces to the system message routing component 606 to exchange data therebetween, and providing administration thereof by an administrator. The system control component 626 also interfaces the output buffers of the remaining systems Filter System2, . . . , Filter SystemN to provide sampling capability of those systems by the administrator to ascertain quality control of the pre-processing and filtering capabilities. The administrator can also access the user inbox routing component 622 via the system control component 626 to oversee operation of thereof.

It is appreciated that the filter systems (608, 610, and 612) can be separate pre-processing and filter algorithms running on dedicated computers, or combinations of computers. Alternatively, where the hardware capability exists, the algorithms can be running together on a single computer such that all filtering is performed on a single robust machine.

Figure 7:
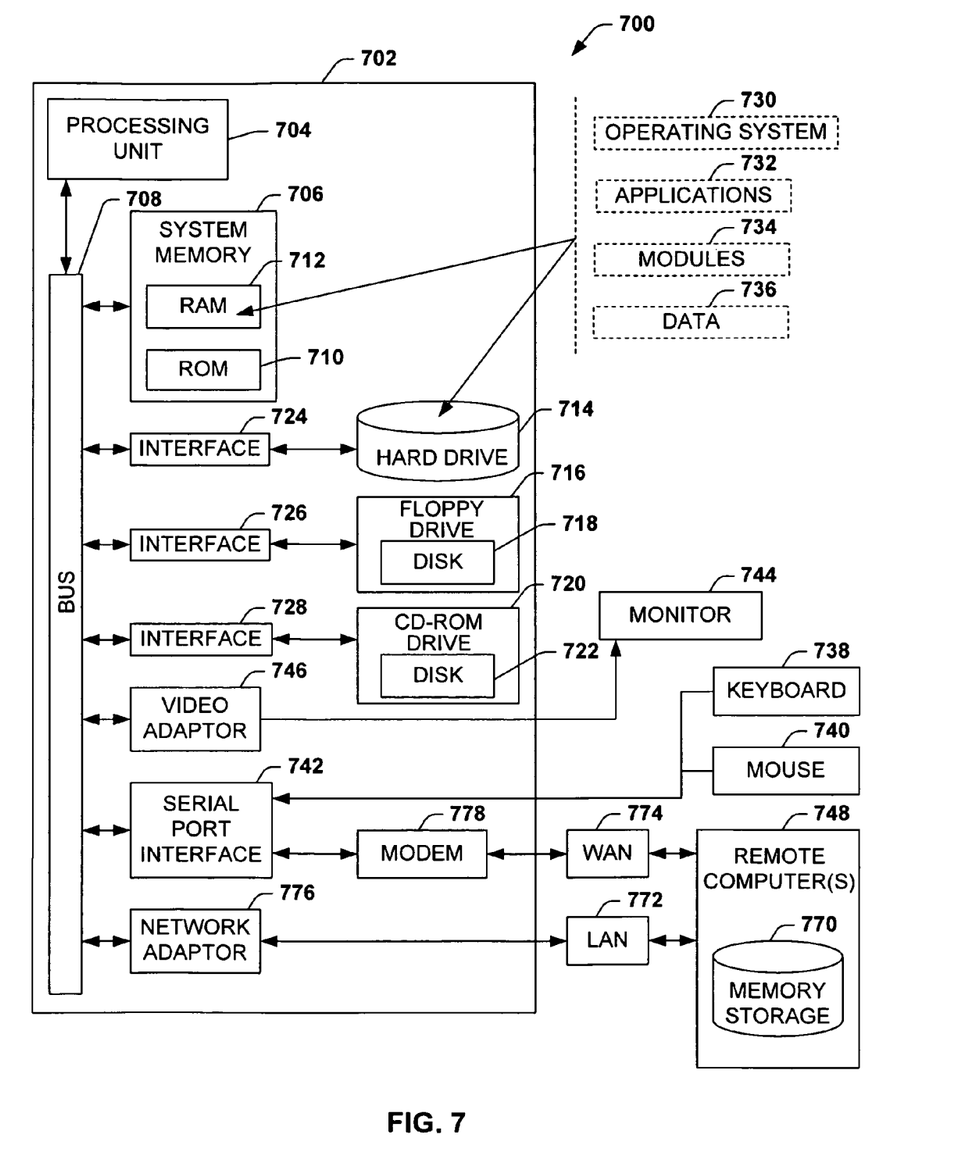
FIG. 7 illustrates a block diagram of a computer operable to execute the disclosed architecture.

Referring now to FIG. 7, there is illustrated a block diagram of a computer operable to execute the disclosed architecture. In order to provide additional context for various aspects of the present invention, FIG. 7 and the following discussion are intended to provide a brief, general description of a suitable computing environment 700 in which the various aspects of the present invention may be implemented. While the invention has been described above in the general context of computer-executable instructions that may run on one or more computers, those skilled in the art will recognize that the invention also may be implemented in combination with other program modules and/or as a combination of hardware and software. Generally, program modules include routines, programs, components, data structures, etc., that perform particular tasks or implement particular abstract data types. Moreover, those skilled in the art will appreciate that the inventive methods may be practiced with other computer system configurations, including single-processor or multi-processor computer systems, minicomputers, mainframe computers, as well as personal computers, hand-held computing devices, microprocessor-based or programmable consumer electronics, and the like, each of which may be operatively coupled to one or more associated devices. The illustrated aspects of the invention may also be practiced in distributed computing environments where certain tasks are performed by remote processing devices that are linked through a communications network. In a distributed computing environment, program modules may be located in both local and remote memory storage devices.

With reference again to FIG. 7, the exemplary environment 700 for implementing various aspects of the invention includes a computer 702, the computer 702 including a processing unit 704, a system memory 706 and a system bus 708. The system bus 708 couples system components including, but not limited to the system memory 706 to the processing unit 704. The processing unit 704 may be any of various commercially available processors. Dual microprocessors and other multi-processor architectures also can be employed as the processing unit 704.

The system bus 708 can be any of several types of bus structure including a memory bus or memory controller, a peripheral bus and a local bus using any of a variety of commercially available bus architectures. The system memory 706 includes read only memory (ROM) 710 and random access memory (RAM) 712. A basic input/output system (BIOS), containing the basic routines that help to transfer information between elements within the computer 702, such as during start-up, is stored in the ROM 710.

The computer 702 further includes a hard disk drive 714, a magnetic disk drive 716, (e.g., to read from or write to a removable disk 718) and an optical disk drive 720, (e.g., reading a CD-ROM disk 722 or to read from or write to other optical media). The hard disk drive 714, magnetic disk drive 716 and optical disk drive 720 can be connected to the system bus 708 by a hard disk drive interface 724, a magnetic disk drive interface 726 and an optical drive interface 728, respectively. The drives and their associated computer-readable media provide nonvolatile storage of data, data structures, computer-executable instructions, and so forth. For the computer 702, the drives and media accommodate the storage of broadcast programming in a suitable digital format. Although the description of computer-readable media above refers to a hard disk, a removable magnetic disk and a CD, it should be appreciated by those skilled in the art that other types of media which are readable by a computer, such as zip drives, magnetic cassettes, flash memory cards, digital video disks, cartridges, and the like, may also be used in the exemplary operating environment, and further that any such media may contain computer-executable instructions for performing the methods of the present invention.

A number of program modules can be stored in the drives and RAM 712, including an operating system 730, one or more application programs 732, other program modules 734 and program data 736. It is appreciated that the present invention can be implemented with various commercially available operating systems or combinations of operating systems.

A user can enter commands and information into the computer 702 through a keyboard 738 and a pointing device, such as a mouse 740. Other input devices (not shown) may include a microphone, an IR remote control, a joystick, a game pad, a satellite dish, a scanner, or the like. These and other input devices are often connected to the processing unit 704 through a serial port interface 742 that is coupled to the system bus 708, but may be connected by other interfaces, such as a parallel port, a game port, a universal serial bus ("USB"), an IR interface, etc. A monitor 744 or other type of display device is also connected to the system bus 708 via an interface, such as a video adapter 746. In addition to the monitor 744, a computer typically includes other peripheral output devices (not shown), such as speakers, printers etc.

The computer 702 may operate in a networked environment using logical connections to one or more remote computers, such as a remote computer(s) 748. The remote computer(s) 748 may be a workstation, a server computer, a router, a personal computer, portable computer, microprocessor-based entertainment appliance, a peer device or other common network node, and typically includes many or all of the elements described relative to the computer 702, although, for purposes of brevity, only a memory storage device 750 is illustrated. The logical connections depicted include a LAN 752 and a WAN 754. Such networking environments are commonplace in offices, enterprise-wide computer networks, intranets and the Internet.

When used in a LAN networking environment, the computer 702 is connected to the local network 752 through a network interface or adapter 756. When used in a WAN networking environment, the computer 702 typically includes a modem 758, or is connected to a communications server on the LAN, or has other means for establishing communications over the WAN 754, such as the Internet. The modem 758, which may be internal or external, is connected to the system bus 708 via the serial port interface 742. In a networked environment, program modules depicted relative to the computer 702, or portions thereof, may be stored in the remote memory storage device 750. It is to be appreciated that the network connections shown are exemplary and other means of establishing a communications link between the computers may be used.

In accordance with one aspect of the present invention, the filter architecture adapts to the degree of filtering desired by the particular user of the system on which the filtering is employed. It can be appreciated, however, that this "adaptive" aspect can be extended from the local user system environment back to the manufacturing process of the system vendor where the degree of filtering for a particular class of users can be selected for implementation in systems produced for sale at the factory. For example, if a purchaser decides that a first batch of purchased systems are to be provided for users that do should not require access to any junk mail, the default setting at the factory for this batch of systems can be set high, whereas a second batch of systems for a second class of users can be configured for a lower setting to all more junk mail for review. In either scenario, the adaptive nature of the present invention can be enabled locally to allow the individual users of any class of users to then adjust the degree of filtering, or if disabled, prevented from altering the default setting at all. It is also appreciated that a network administrator who exercises comparable access rights to configure one or many systems suitably configured with the disclosed filter architecture, can also implement such class configurations locally.

What has been described above includes examples of the present invention. It is, of course, not possible to describe every conceivable combination of components or methodologies for purposes of describing the present invention, but one of ordinary skill in the art may recognize that many further combinations and permutations of the present invention are possible. Accordingly, the present invention is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system, comprising:
a computer-readable storage device, comprising:
pre-rendering logic that receives a message containing unrendered text and a non-text element intended to thwart a junk filter by varying the unrendered text and that renders the message in a user—perceivable format;
converting logic that converts the rendered message into a text-only message by removing the non-text element of the rendered message and rendering words and phrases of the rendered message into text, the converting logic mitigating an affect of the non-text element; and
filtering logic that filters the text-only message based upon predetermined content related to a degree of visibility of user-perceivable content of the rendered message, the filtering logic including weighting logic that adjusts a weighting parameter associated with the text of the text-only message to determine if the text should be removed, the filtering logic further making a determination of whether to handle the message as a junk message or a legitimate message based at least in part on a number of images associated with the text-only message and a total area of the images associated with the text-only message.

2. The system of claim 1, wherein the pre-rendering logic is a display engine that renders the message in the user-perceivable format that is to be presented to a user via a display.

3. The system of claim 1, wherein the pre-rendering logic is a display engine that renders the message, into the user-perceivable format by at least one of removing comments, applying decoration, skipping invalid decoration commands, and applying final positions, the message being an e-mail.

4. The system of claim 1, wherein the converting logic removes from the rendered message at least one of graphics, color, non-text decoration, and spacing not rendered as ASCII-style or Unicode-style characters.

5. The system of claim 4, wherein at least one of the graphics, color, non-text decoration, and spacing not rendered as ASCII-style or Unicode-style characters is utilized by the filtering logic to change a weighting parameter of at least one of a character, a word, and the text.

6. The system of claim 1, wherein the text-only message is analyzed for at least one of embedded tags, comments, and invisible and substantially invisible text.

7. The system of claim 1, wherein the filtering logic includes a support vector machine utilized for determining a weight of a word.

8. The system of claim 1, further comprising non-text decoding logic that decodes non-text-encoded portions of the message.

9. The system of claim 1, wherein the filtering logic is further configured to process images to ascertain if the image is junk-related by determining at least one of image size, image dimension, image type, and image location.

10. A system, comprising:
a processor; and
a memory communicatively coupled to the processor for storing computer-executable instructions that, when executed by the processor, perform operations comprising:
receiving a message containing unrendered text and a non-text element intended to thwart a junk filter by varying the unrendered text;
pre-rendering the message into a first format corresponding to content intended to be user perceived;
adjusting a weighting parameter associated with text of the message to determine if the text should be removed related to a degree of visibility of the user-perceivable content of the rendered message;
converting the message of the first format into a character-only message; and
determining whether to handle the message as a junk message or a legitimate message based on the character-only message, the determining being based at least in part on a number of images associated with the message and a total area of the images associated with the message.

11. The system of claim 10, wherein the pre-rendering is performed by a display engine that renders the message into the first format by at least one of removing comments, applying decoration, skipping invalid decoration commands, and applying final positioning, the message being an e-mail message.

12. The system of claim 10, wherein the converting includes removing from the rendered message at least one of graphics, color, non-text decoration, and spacing not rendered as ASCII-style or Unicode-style characters.

13. The system of claim 12, wherein at least one of the graphics, color, non-text decoration, and spacing not rendered as ASCII-style or Unicode-style characters, is utilized by a filtering component to change a weighting parameter associated with at least one of a character, word, and text.

14. The system of claim 10, further comprising non-text decoding of non-text-encoded portions of the message.

15. The system of claim 10, further comprising processing images to ascertain if the image is junk-related by determining at least one of image size, image dimension, image type, image location, number of images, and area consumed by a plurality of the images.

16. A method, comprising:
receiving a message containing unrendered text and a non-text element intended to thwart a junk filter by varying the unrendered text;
pre-rendering the message into a first format corresponding to content intended to be user perceived, the pre-rendering mitigating an affect of the non-text element;
adjusting a weighting parameter associated with text of the message to determine if the text should be removed relative to a degree of visibility of the user-perceivable content of the rendered message;
converting the message of the first format into a character-only message;
creating a hash of the message and images within the message to determine whether the message and future messages are junk messages; and
determining whether to handle the message as a junk message or a legitimate message based on the character-only message and the hash, the determining being based at least in part on a number of images associated with the message or whether images associated with the message link to another source.

17. The method of claim 16, wherein the message is pre-rendered with a display engine such that the message of the first format is displayed to a user.

18. The method of claim 16, wherein the message is pre-rendered with a display engine that renders the message into the first format by at least one of removing comments, applying decoration, skipping invalid decoration commands, and applying final positioning.

19. The method of claim 16, wherein the message of the first format is converted by removing at least one of graphics, color, non-text decoration, and spacing not rendered as ASCII-style or Unicode-style characters.

20. The method of claim 16, wherein the message is analyzed for at least one of embedded tags and comments.

21. The method of claim 16, wherein the message is rendered and analyzed for raw HTML features.

22. The method of claim 16, wherein the character-only format is a text-only format.

23. The method of claim 22, the message in text-only format is processed to analyze a word or plurality of words for at least one of font size, brightness, special formatting, and placement in a link.

24. The method of claim 23, wherein the word or plurality of words are removed from the message when one or more of the word(s) or one or more characters of the word(s) are invisible or substantially invisible.

25. The method of claim 16, wherein the message is an e-mail message.

26. The method of claim 16, further comprising decoding non-text-encoded portions of the message.

27. The method of claim 26, wherein the non-text decoding component is a MIME decoder.

28. The method of claim 16, further comprising processing images to ascertain if the image is junk-related by determining at least one of image size, image dimension, image type, image location, number of images, and area consumed by a plurality of the images.

* * * * *